US008306758B2

(12) United States Patent
Bloomfield et al.

(10) Patent No.: US 8,306,758 B2
(45) Date of Patent: Nov. 6, 2012

(54) SYSTEMS AND METHODS FOR MAINTAINING THE PRECISION OF MASS MEASUREMENT

(75) Inventors: Nic G. Bloomfield, Newmarket (CA); Gordana Ivosev, Etobicoke (CA)

(73) Assignee: DH Technologies Development Pte. Ltd., Singapore (SG)

( * ) Notice: Subject to any disclaimer, the term of this patent is extended or adjusted under 35 U.S.C. 154(b) by 359 days.

(21) Appl. No.: 12/573,080

(22) Filed: Oct. 2, 2009

(65) Prior Publication Data

US 2011/0082658 A1 Apr. 7, 2011

(51) Int. Cl.
*G01N 31/00* (2006.01)
*G01D 18/00* (2006.01)

(52) U.S. Cl. ........... 702/23; 702/28; 702/85; 250/252.1; 250/281

(58) Field of Classification Search .................... 702/23, 702/28, 85; 250/252.1, 281
See application file for complete search history.

(56) References Cited

U.S. PATENT DOCUMENTS

2006/0020400 A1 * 1/2006 Okamura et al. ............... 702/22
2007/0033158 A1 2/2007 Gopalan et al.
2008/0067346 A1 3/2008 Amster et al.
2009/0152455 A1 * 6/2009 Wang et al. ................ 250/252.1

* cited by examiner

*Primary Examiner* — Andrew Schechter
*Assistant Examiner* — L. Anderson
(74) *Attorney, Agent, or Firm* — John R. Kasha; Kasha Law LLC

(57) ABSTRACT

Reference features are updated based on a previous scan during each mass spectrometry scan of a sample. Reference features with reference feature confidence values are generated from a plurality of initial scans. For each subsequent scan of a sample, sample features and sample feature confidence values are calculated. The reference features and sample features are aligned to determine common features. Constants are determined for an equation of mass of the mass spectrometer using confidence weighted regression of the common features. The constants and the equation of mass are used to calculate new mass values for the sample features. The reference features are updated using the sample features and the reference feature confidence values are recalculated in order to maintain the accuracy of reference features for calibration.

20 Claims, 5 Drawing Sheets

100

SYSTEMS AND METHODS FOR MAINTAINING THE PRECISION OF MASS MEASUREMENT

INTRODUCTION

Mass spectrometer calibration is an integral part of instrument operation, but the ability to assign mass over a period of time following calibration is adversely affected by high frequency and low frequency changes in the instrument. High frequency changes occur from scan to scan and result from power supply instability, noise, and other factors. Low frequency changes are caused by slow changes due to, for example, changes in temperature.

In principle it is possible to use a reference compound to calibrate every scan, but this has several disadvantages. A method for introducing the compound is required. The mass range of the reference compound(s) must cover the range of interest. The signal levels of the reference and analytes must be maintained at appropriate values which can be hampered by the analyte suppressing the compound or the compound suppressing the analyte. For best results and to cover the complete mass range, several compounds (e.g. ten compounds) are generally required. Finally, using a reference compound to calibrate every scan makes the experiment more complex.

BRIEF DESCRIPTION OF THE DRAWINGS

The skilled artisan will understand that the drawings, described below, are for illustration purposes only. The drawings are not intended to limit the scope of the present teachings in any way.

Figure 1:
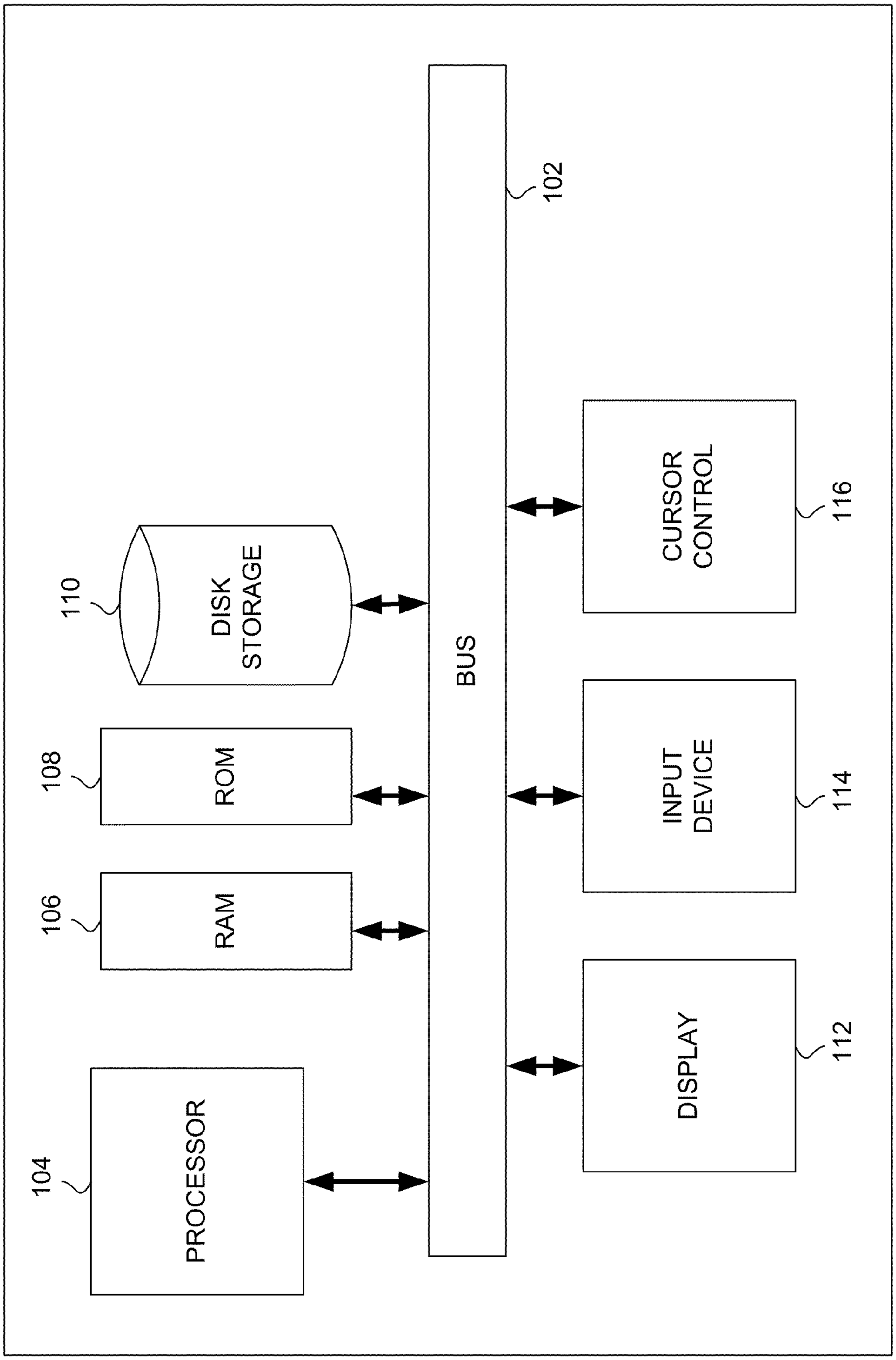
FIG. 1 is a block diagram that illustrates a computer system, upon which embodiments of the present teachings may be implemented.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for determining base calls, and instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively hard-wired circuitry may be used in place of or in combination with software instructions to implement the present teachings. Thus implementations of the present teachings are not limited to any specific combination of hardware circuitry and software.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Methods of Data Processing

In general, an equation for mass for a mass spectrometer can be expressed as a function of one or more measured variables and constants. For example, in a time-of-flight (TOF) instrument the measured variable is the time of flight (t) and the equation of mass is $$\sqrt{m}=a(t-t_0),$$

where the constants are a and $t_0$.

Continuous introduction of a single compound (a lock mass) has been used to correct the calibration of individual mass spectrometry scans but the performance is poor. This is because it is not possible to adjust all of the constants in the equation for mass with a singe measurement. For example, in the equation of mass for a TOF instrument it is not possible to adjust both of the constants a and $t_0$. Furthermore, the error introduced by using a single peak will always be greater than from multiple peaks since averaging will reduce the error and will be less susceptible to interference.

Calibration of mass spectrometry scans can also include two separate steps. A first step involves calibrating to get the best mass accuracy, which requires one or more compounds of known mass. A second step involves keeping the system synchronized to a common reference, which may or may not be accurate and who's mass or masses may be unknown. The first step can be performed before or after the data is acquired. If the first step is performed after the data is acquired, then the first step applies to all spectra since the initial common reference is adjusted.

In various embodiments, background and experimental spectra are obtained and used during each mass spectrometry scan to keep the system synchronized to a common reference. Given sufficient sensitivity and intra-spectral mass accuracy it is possible to monitor all ions (analyte and background) and track subtle calibration shifts, since on average all ions will be affected in the same way by shifts in calibration.

Calibration adjustment with known lock masses, which is described above, involves re-calibration of a spectrum once ions have been identified. Also, compounds present in a spectrum can be identified from the results of a peptide database search, for example. These identified compounds can then be used to obtain better mass accuracy for ions that are not indentified. In contrast, in the approach in which background and experimental spectra are obtained and used during each mass spectrometry scan, multiple unknown ions are used to adjust individual spectra to a common reference.

Figure 2:
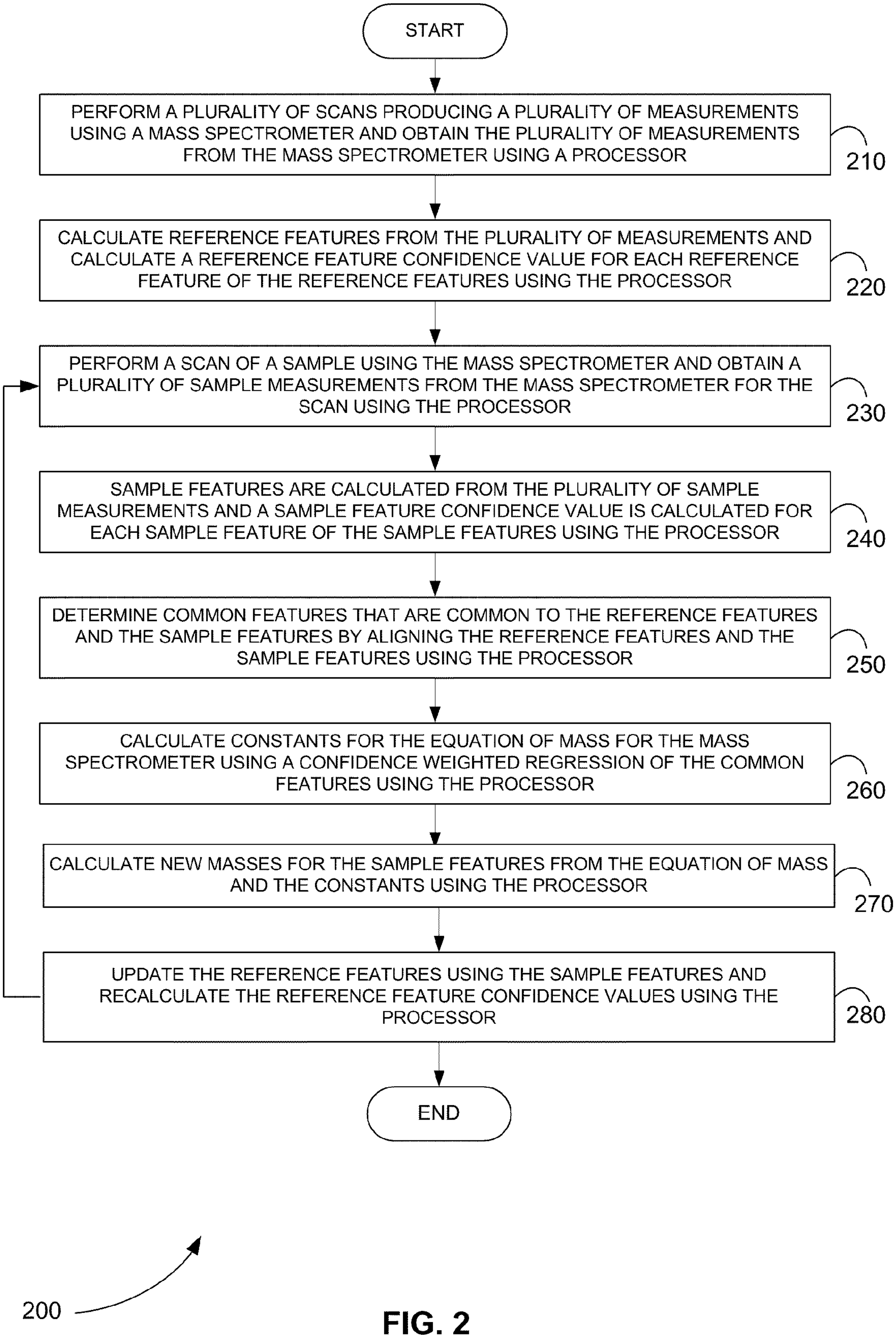
FIG. 2 is an exemplary flowchart showing a method for maintaining the accuracy of calibration reference features during mass spectrometry that is consistent with the present teachings.

FIG. 2 is an exemplary flowchart showing a method 200 for maintaining the accuracy of calibration reference features during mass spectrometry of a sample that is consistent with the present teachings.

In step 210 of method 200, a plurality of scans producing a plurality of measurements is performed using a mass spectrometer and the plurality of measurements is obtained from the mass spectrometer using a processor. The number of scans performed is dependent on the mass spectrometer used, but the number should be enough to accurately cover any high frequency changes that are occurring. The plurality of scans is, for example, a plurality of background scans. In various embodiments, the plurality of scans is a plurality of scans that include the background and an analyte.

In step 220, reference features are calculated from the plurality of measurements and a reference feature confidence value for each reference feature of the reference features is calculated using the processor. The reference features and the reference feature confidence values are calculated without determining the identity of the reference ions represented by the reference features.

In various embodiments, a feature is a representation of data that can be aligned with features from other data. Features can include, but are not limited to, a list of peaks, a list of representatives of peaks, or a spectrum. A representative of a peak can include, but is not limited to, a centroid of a peak or a center of gravity of a peak. A reference feature confidence value is based on an intensity of a reference feature, the degree of saturation of the reference feature, and a number of times the reference feature has been observed, for example. In various embodiments, the reference features and the reference feature confidence values are determined from a confidence weighted average of the plurality of scans performed in step 210.

The reference features are determined at the beginning of a mass spectrometry run and are used to correct subsequent (experimental) spectra, for example. The reference features are updated during the subsequent runs as the background and analyte signals change.

In step 230, a scan of a sample is performed using the mass spectrometer and a plurality of sample measurements is obtained from the mass spectrometer for the scan using the processor.

In step 240, sample features are calculated from the plurality of sample measurements and a sample feature confidence value is calculated for each sample feature of the sample features using the processor. The sample features and the sample feature confidence values are also calculated without determining the identity of the sample ions represented by the sample features using the processor. A sample feature confidence value is based on an intensity of a sample feature and the degree of saturation of the sample feature, for example.

In step 250, common features that are common to the reference features and the sample features are determined by aligning the reference features and the sample features using the processor.

In step 260, new constants for the equation of mass for the mass spectrometer are calculated using a confidence weighted regression of the common features using the processor. The regression is performed using standard linear or non-linear methods, for example. Detecting large numbers of common features produces more accurate values for the constants of the equation of mass. A large number of peaks is more than 30, for example. In various embodiments, the equation of mass can include, but is not limited to, an equation of mass for a time-of-flight, quadrupole, ion trap, Fourier transform, Orbitrap, or magnetic sector mass spectrometer. The equation for mass for a time-of-flight mass spectrometer is $\sqrt{m}=a(t-t_0)$, for example. The constants of this equation include a and $t_0$.

In step 270, new masses are calculated for the sample features from the equation of mass and the new constants using the processor.

In step 280, the reference features are updated using the sample features and the reference feature confidence values are recalculated using the processor. The reference features are updated by merging them with the sample features, for example. In various embodiments, the masses of peaks represented by common features are averaged to merge the reference features with the sample features. Confidence values for new sample features are initially low and increase if the sample feature is observed in subsequent scans of the sample. In various embodiments, updating the reference features includes removing reference features that have not been observed in a list of sample features for more than a maximum number of scans or for a given amount of time.

Steps 230-280 are then executed again for each additional mass spectrometry scan that is made for a sample.

Each scan is calibrated relative to the one before it, so all subsequent scans are calibrated relative to the initial calibration. This approach effectively removes both low frequency and high frequency calibration shifts. Note again that it is not necessary to know the identity or mass of any ions to maintain the precision of the calibration. Absolute calibration can be performed using known masses prior to the analysis or by calibrating any selected spectrum from the run after the analysis. Method 200 is performed in real time and requires no intervention by the user, for example.

Figure 3:
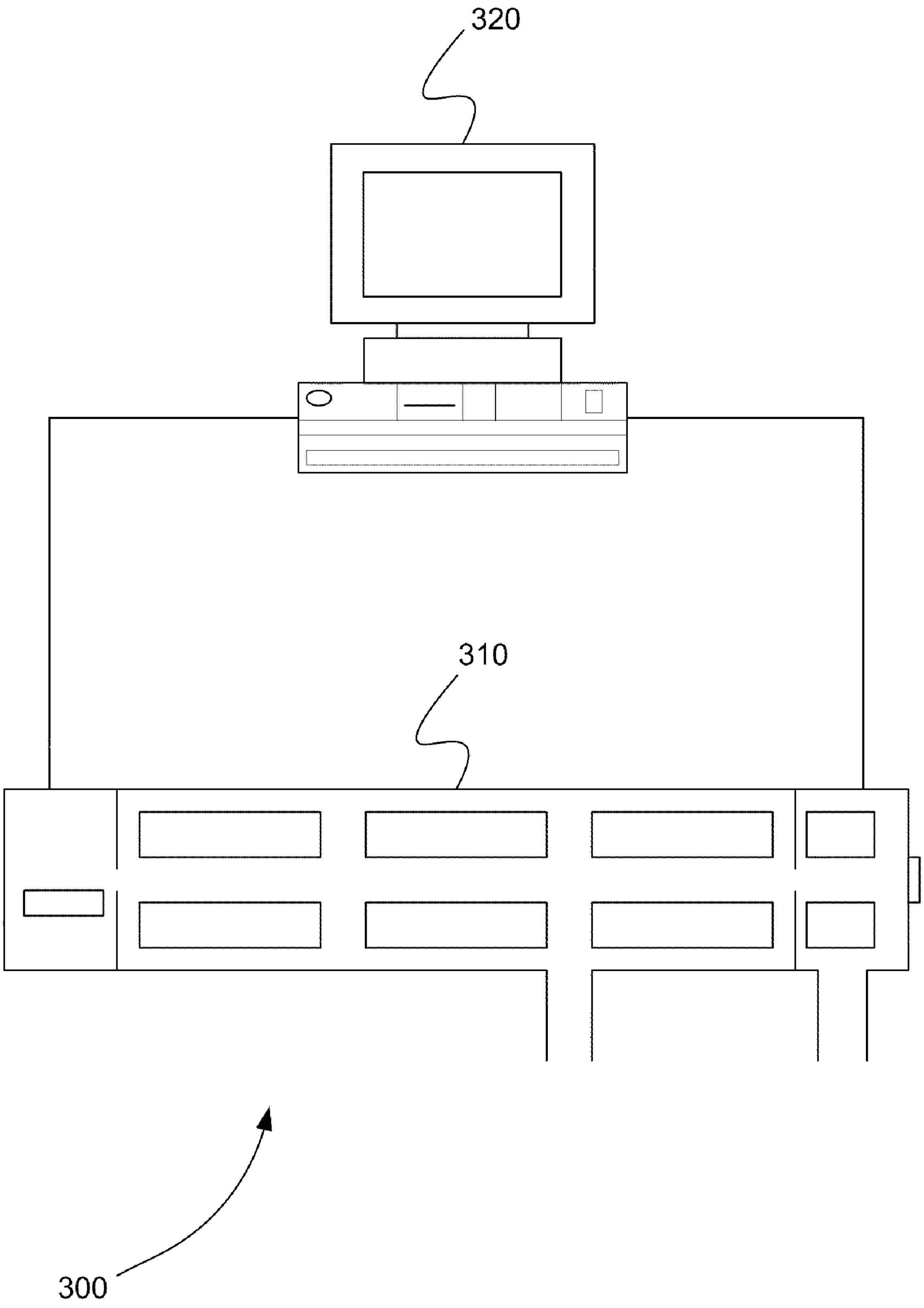
FIG. 3 is a schematic diagram showing a system for maintaining the accuracy of calibration reference features during mass spectrometry, in accordance with the present teachings.

FIG. 3 is a schematic diagram showing a system 300 for maintaining the accuracy of calibration reference features during mass spectrometry, in accordance with the present teachings. System 300 includes mass spectrometer 310 and processor 320. Processor 320 can be, but is not limited to, a computer, microprocessor, or any device capable of sending and receiving control signals and data from mass spectrometer 310 and processing data. Mass spectrometer 310 can include, but is not limited to including, a time-of-flight (TOF), quadrupole, ion trap, Fourier transform, Orbitrap, or magnetic sector mass spectrometer.

Processor 320 is in communication with mass spectrometer 310. Mass spectrometer 310 and processor 320 perform a number of steps.

(1) Mass spectrometer 310 performs a plurality of scans producing a plurality of measurements.

(2) Processor 320 obtains the plurality of measurements from mass spectrometer 310.

(3) Processor 320 calculates reference features from the plurality of measurements and calculates a reference feature confidence value for each reference feature of the reference features without determining the identity of the reference ions represented by the reference features.

(4) Mass spectrometer 310 performs a scan of a sample.

(5) Processor 320 obtains a plurality of sample measurements from mass spectrometer 310 for the scan.

(6) Processor 320 calculates sample features from the plurality of sample measurements and calculates a sample feature confidence value for each sample feature of the sample features without determining the identity of the sample ions represented by the sample features.

(7) Processor 320 determines common features that are common to the reference features and the sample features by aligning the reference features and the sample features.

(8) Processor 320 calculates constants for an equation of mass for mass spectrometer 310 using a confidence weighted regression of the common features.

(9) Processor 320 calculates new masses for the sample features from the equation of mass and the constants.

(10) Processor 320 updates the reference features using the sample features and recalculates the reference feature confidence values.

Steps (4)-(10) are repeated until no more scans are performed on the sample.

In various embodiments, a computer program product includes a tangible computer-readable storage medium whose contents include a program with instructions being executed on a processor so as to perform a method for maintaining the accuracy of calibration reference features during mass spectrometry. This method is performed by a system of distinct software modules.

Figure 4:
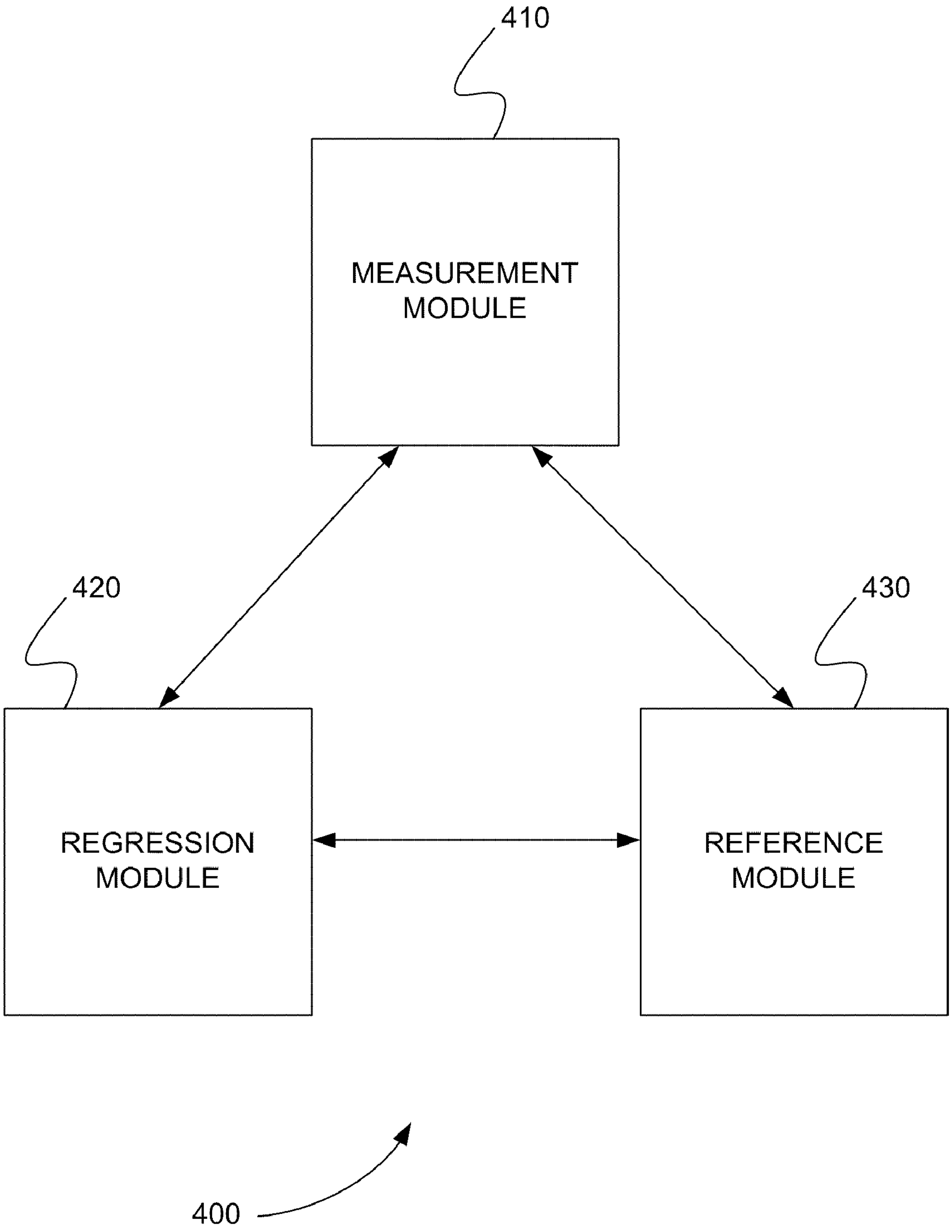
FIG. 4 is a schematic diagram of a system of distinct software modules that performs a method for maintaining the accuracy of calibration reference features during mass spectrometry, in accordance with the present teachings.

FIG. 4 is a schematic diagram of a system 400 of distinct software modules that performs a method for maintaining the accuracy of calibration reference features during mass spectrometry, in accordance with the present teachings. System 400 includes measurement module 410, regression module 420, and reference module 430.

Measurement module 410, regression module 420, and reference module 430 perform a number of steps.

(1) Measurement module 410 obtains a plurality of measurements from a mass spectrometer that performs a plurality of scans.

(2) Reference module 430 calculates reference features from the plurality of measurements and calculates a reference feature confidence value for each reference feature of the reference features without determining the identity of the reference ions represented by the reference features.

(3) Measurement module 410 obtains a plurality of sample measurements from the mass spectrometer that performs a scan of the sample.

(4) Regression module 420 calculates sample features from the plurality of sample measurements and calculates a sample feature confidence value for each sample feature of the sample features without determining the identity of the sample ions represented by the sample features.

(5) Regression module 420 determines common features that are common to the reference features and the sample features by aligning the reference features and the sample features.

(6) Regression module 420 calculates constants for an equation of mass for the mass spectrometer using a confidence weighted regression of the common features.

(7) Reference module 430 calculates new masses for the sample features from the equation of mass and the constants.

(8) Reference module 430 updates the reference features using the sample features and recalculates the reference feature confidence values.

Steps (3)-(8) are repeated until no more scans are performed on the sample.

Aspects of the present teachings may be further understood in light of the following examples, which should not be construed as limiting the scope of the present teachings in any way.

Data Examples

Figure 5:
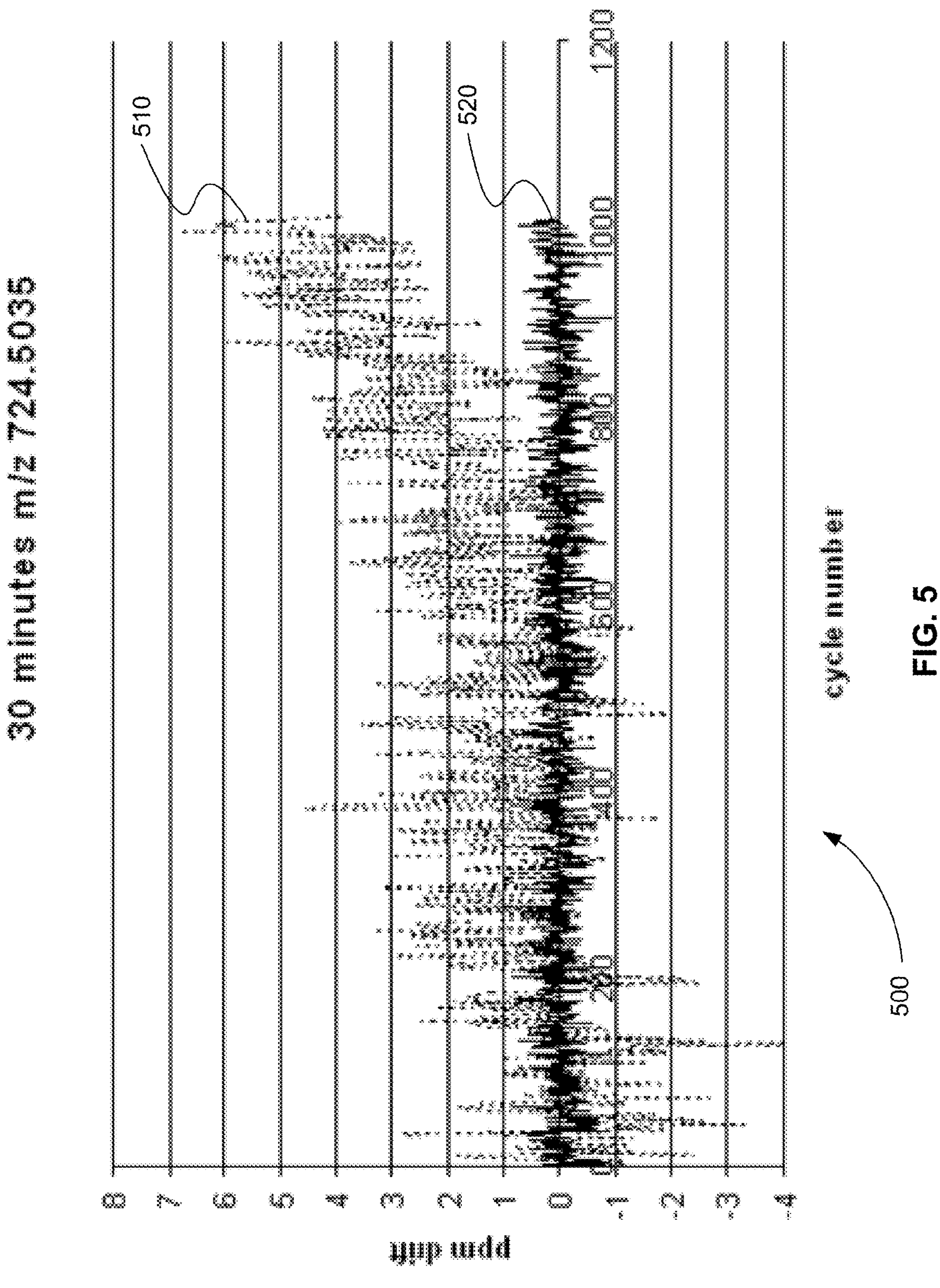
FIG. 5 is an exemplary plot of the mass accuracy for particular mass over a number of scans of a sample with and without a method for maintaining the accuracy of calibration reference features during mass spectrometry, in accordance with the present teachings.

FIG. 5 is an exemplary plot 500 of the mass accuracy of a particular mass over a number of scans of a sample with and without a method for maintaining the accuracy of calibration reference features during mass spectrometry, in accordance with the present teachings.

Data values 510 in plot 500 show the mass accuracy or calibration drift of a particular mass over a number of scans of a sample without a method for maintaining the accuracy of calibration reference features during mass spectrometry, in accordance with various embodiments. Data values 510 show a short term variation of approximately plus or minus two to three parts per million and a long term drift of approximately six parts per million.

Data values 520 in plot 500 show the mass accuracy of a particular mass over a number of scans of a sample with a method for maintaining the accuracy of calibration reference features during mass spectrometry, in accordance with various embodiments. Data values 520 show an effective precision of approximately plus or minus 0.3 parts per million. Note also that this is at high mass which is typically difficult to calibrate accurately (reference compounds with good coverage are harder to find and introduce; ion intensity is often lower).

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for maintaining the accuracy of calibration reference features during mass spectrometry of a sample, comprising: a mass spectrometer; and a processor in communication with the mass spectrometer, wherein (a) the mass spectrometer performs a plurality of scans producing a plurality of measurements, (b) the processor obtains the plurality of measurements from the mass spectrometer, (c) the processor calculates reference features from the plurality of measurements and calculates a reference feature confidence value for each reference feature of the reference features without knowing an identity of reference ions represented by the reference features, (d) the mass spectrometer performs a scan of a sample, (e) the processor obtains a plurality of sample measurements from the mass spectrometer for the scan, (f) the processor calculates sample features from the plurality of sample measurements and calculates a sample feature confidence value for each sample feature of the sample features without knowing an identity of sample ions represented by the sample features, (g) the processor determines common features that are common to the reference features and the sample features by aligning the reference features and the sample features, (h) the processor calculates constants for an equation of mass for the mass spectrometer using a confidence weighted regression of the common features, (i) the processor calculates new masses for the sample features from the equation of mass and the constants, (j) the processor updates the reference features using the sample features and recalculates the reference feature confidence values, and (k) steps (d)-(k) are repeated until no more scans are performed on the sample.

2. The system of claim 1, wherein the reference features comprise a reference peak list, the sample features comprise a sample peak list, and the common features comprise a common peak list.

3. The system of claim 1, wherein the reference features comprise a reference spectrum, the sample features comprise a sample spectrum, and the common features comprise a common spectrum.

4. The system of claim 1, wherein a reference feature confidence value is based on an intensity of a reference peak of a reference feature, a degree of saturation of the reference peak, and a number of times the reference peak has been observed.

5. The system of claim 1, wherein a sample feature confidence value is based on an intensity of a sample peak of a sample feature and a degree of saturation of the sample peak.

6. The system of claim 1, wherein the processor updates the reference features by removing reference masses that have not been observed in a sample feature for more than a maximum number of scans.

7. The system of claim 6, wherein the constants comprise constants of the equation of mass for a time-of-flight mass spectrometer.

8. The system of claim 1, wherein the equation of mass comprises an equation of mass for a time-of-flight mass spectrometer.

9. A method for maintaining the accuracy of calibration reference features during mass spectrometry of a sample, comprising:

(a) performing a plurality of scans producing a plurality of measurements using a mass spectrometer;

(b) obtaining the plurality of measurements from the mass spectrometer using a processor;

(c) calculating reference features from the plurality of measurements and calculating a reference feature confidence value for each reference feature of the reference features without knowing an identity of reference ions represented by the reference features using the processor;

(d) performing a scan of the sample using the mass spectrometer;

(e) obtaining a plurality of sample measurements from the mass spectrometer for the scan using the processor;

(f) calculating sample features from the plurality of sample measurements and calculating a sample feature confidence value for each sample feature of the sample features without knowing an identity of ions represented by the sample features using the processor;

(g) determining common features that are common to the reference features and the sample features by aligning the reference features and the sample features using the processor;

(h) calculating constants for an equation of mass for the mass spectrometer using a confidence weighted regression of the common features using the processor;

(i) calculating new masses for the sample features from the equation of mass and the constants using the processor;

(j) updating the reference features using the sample features and recalculating the reference feature confidence values using the processor; and (k) repeating steps (d)-(k) until no more scans are performed on the sample.

10. The method of claim 9, wherein the reference features comprise a reference peak list, the sample features comprise a sample peak list, and the common features comprise a common peak list.

11. The method of claim 9, wherein the reference features comprise a reference spectrum, the sample features comprise a sample spectrum, and the common features comprise a common spectrum.

12. The method of claim 9, wherein a reference feature confidence value is based on an intensity of a reference peak of a reference feature, a degree of saturation the reference peak, and a number of times the reference peak has been observed.

13. The method of claim 9, wherein a sample feature confidence value is based on an intensity of a sample peak of a sample feature and a degree of saturation of the sample peak.

14. The method of claim 9, wherein updating the reference features comprises removing reference masses that have not been observed in a sample feature for more than a maximum number of scans.

15. The method of claim 9, wherein the equation of mass comprises an equation of mass for a time-of-flight mass spectrometer.

16. The method of claim 15, wherein the constants comprise constants of the equation of mass for a time-of-flight mass spectrometer.

17. A computer program product, comprising a tangible computer-readable storage medium whose contents include a program with instructions being executed on a processor so as to perform a method for maintaining the accuracy of calibration reference features during mass spectrometry of a sample, the method comprising:

(a) providing a system, wherein the system comprises distinct software modules, and wherein the distinct software modules comprise a measurement module, a regression module, and a reference module;

(b) obtaining a plurality of measurements from a mass spectrometer that performs a plurality of scans using the measurement module;

(c) calculating reference features from the plurality of measurements and calculating a reference feature confidence value for each reference feature of the reference features without knowing an identity of reference ions represented by the reference features using the reference module;

(d) obtaining a plurality of sample measurements from the mass spectrometer that performs a scan of the sample using the measurement module;

(e) calculating sample features from the plurality of sample measurements and calculating a sample feature confidence value for each sample feature of the sample features without knowing an identity of sample ions represented by the sample features using the regression module;

(f) determining common features that are common to the reference features and the sample features by aligning the reference features and the sample features using the regression module;

(g) calculating constants for an equation of mass for the mass spectrometer using a confidence weighted regression of the common features using the regression module;

(h) calculating new masses for the sample features from the equation of mass and the constants using the reference module;

(i) updating the reference features using the sample features and recalculating the reference feature confidence values using the reference module; and (j) repeating steps (d)-(k) until no more scans are performed on the sample.

18. The computer program product of claim 17, wherein the reference features comprise a reference peak list, the sample features comprise a sample peak list, and the common features comprise a common peak list.

19. The computer program product of claim 17, wherein the reference features comprise a reference spectrum, the sample features comprise a sample spectrum, and the common features comprise a common spectrum.

20. The computer program product of claim 17, wherein a reference feature confidence value is based on an intensity of a reference peak of a reference feature, a degree of saturation the reference peak, and a number of times the reference peak has been observed.

* * * * *